United States Patent [19]

Montgomery

[11] 4,429,717

[45] Feb. 7, 1984

[54] VALVE FOR CONTROLLING THE FLOW OF SEMI-LIQUID COMPOSITIONS

[76] Inventor: Robert N. Montgomery, 3728 University Ave., Laurel, Miss. 39440

[21] Appl. No.: 299,539

[22] Filed: Sep. 4, 1981

[51] Int. Cl.³ .................. F16K 11/085; F16K 5/08
[52] U.S. Cl. ................ 137/625.47; 137/242
[58] Field of Search ............ 137/625.47, 238, 240, 137/242

[56] References Cited

U.S. PATENT DOCUMENTS

| | | |
|---|---|---|
| 109,906 | 12/1870 | Hutson . |
| 1,329,016 | 1/1920 | Renkin .................... 137/238 |
| 1,616,386 | 2/1927 | O'Stroske . |
| 2,084,248 | 6/1937 | Ferrari et al. . |
| 2,766,911 | 10/1956 | Greaves et al. ............ 137/238 X |
| 3,100,499 | 8/1963 | Bass . |
| 3,552,440 | 1/1971 | Smith . |
| 3,556,153 | 1/1971 | Barbuto . |
| 3,765,439 | 10/1973 | Wise ........................ 137/242 |

Primary Examiner—Arnold Rosenthal
Attorney, Agent, or Firm—Cushman, Darby & Cushman

[57] ABSTRACT

A three-way valve for controlling the flow of semi-liquid compositions having a cylindrical valve core journalled for rotation within a valve housing, cylindrical fluid passages formed within the valve core whereby each such fluid passage has a circular knife-edge type cutting plate disposed along its outer edge for cutting solids during activation of the valve. Exemplary apparatus according to the invention includes sealing means for the valve seats which are adjustable without disassembly of the valve, and means for providing a continuous water flush across the valve seats during normal operation.

7 Claims, 5 Drawing Figures

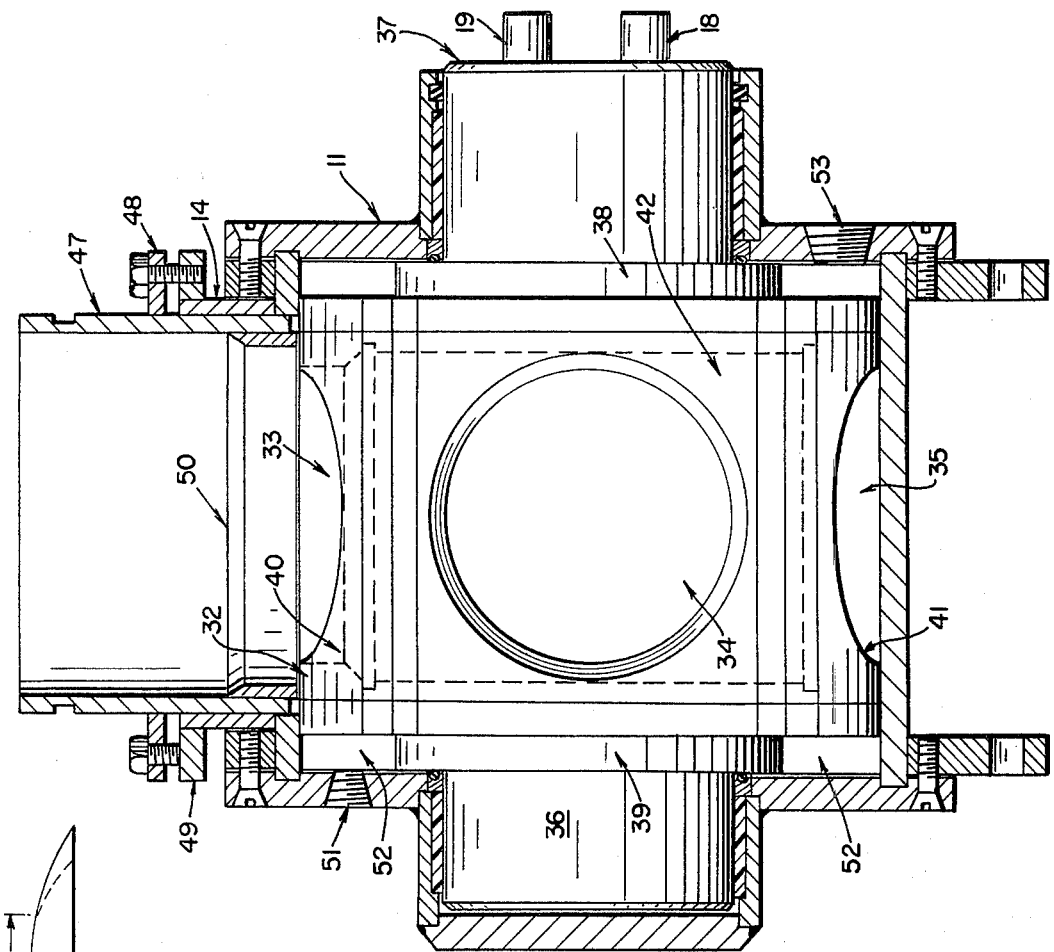
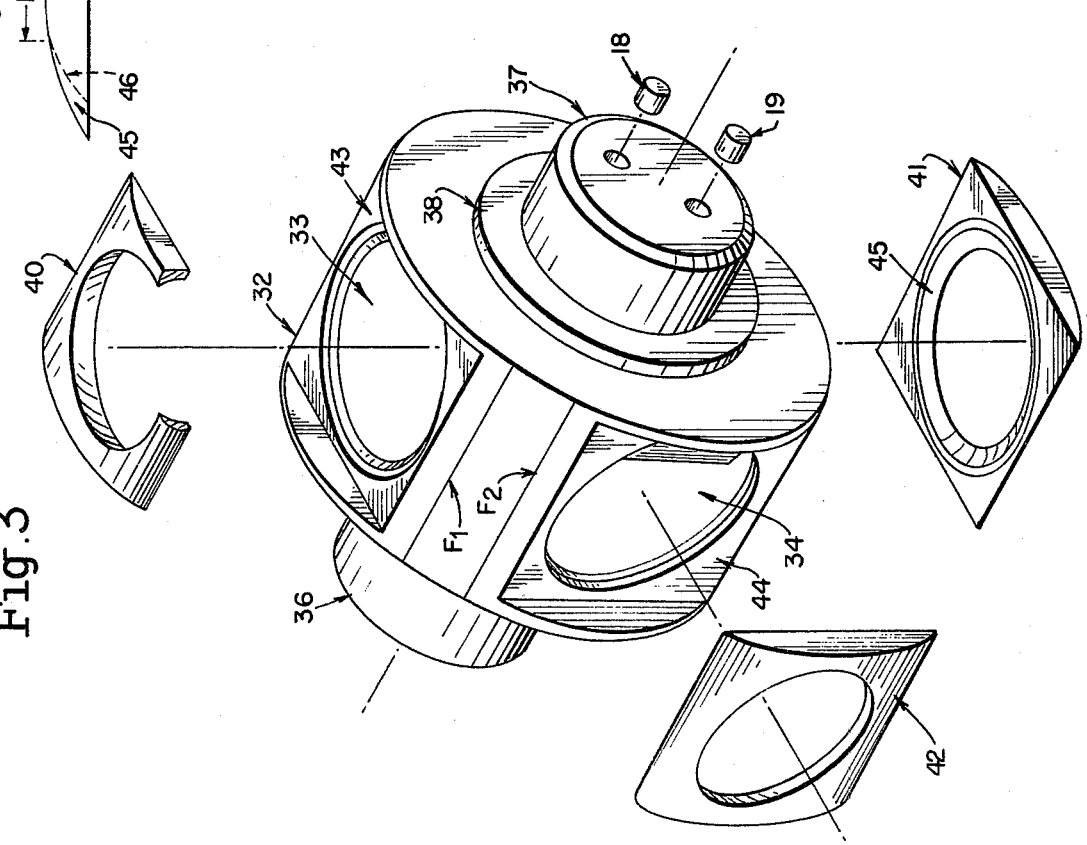

VALVE FOR CONTROLLING THE FLOW OF SEMI-LIQUID COMPOSITIONS

BACKGROUND AND SUMMARY OF THE INVENTION

The present invention relates to three-way type valves for controlling the flow of liquids. More particularly, it relates to a tri-port cylinder valve used to control the flow of semi-liquid compositions and liquid-borne solids. The valve structure according to the invention is particularly suited for controlling process and waste liquid stream in the meat and poultry packing industry where scrap meat, bone fragments, hide, feathers and other waste materials are often pumped via pipelines throughout a processing plant. It is not uncommon, for example, to find as much as 85% by weight solid materials having diameters of up to 3 and 4 inches as the principal flow component in such process streams. Because semi-liquid compositions are considerably higher in viscosity than comparable liquids having no solid particulates, they generally require high pressures and temperatures in order to be effectively transported by way of conventional piping.

Various control problems presented by such severe process conditions have been alleviated by the present invention. Under high pressure and temperature conditions, it is essential that the flow of liquid to processing equipment such as a transfer pump remain free of restriction due to solid materials becoming clogging within the valves or piping structure. It is also important that a process control valve downstream of such equipment be capable of quickly and effectively reversing or altering the flow of a semi-liquid stream high in solids volume without danger of a flow restriction in the valve itself. Thus, the valve must be capable of undergoing severe shock loads due to the high torque necessary to change the valve position and the rapid shifts in fluid dynamics associated with the control of semi-liquid streams. In addition, the combination of high heat, pressure and shock causes various problems in maintaining an adequate liquid seal over an extended period of operation.

Finally, because the composition and flow characteristics of semi-solids vary considerably, it is essential that valves used to control such fluids be capable of adjustment and/or cleaning periodically during operation without removing the valve from service, ie, without necessitating that the valve or its associated piping be completely disassembled prior to cleaning, adjustment or inspection.

The cylindrical three-way type valve structure in accordance with the subject invention substantially eliminates the above problems. In the preferred embodiment of the invention, a unique knife-edge type cutting plate attached to the periphery of each valve port enhances the sealing capabilities of the valve and effectively eliminates the possibility that the valve or its associated piping will become clogged by large-diameter solids materials. Although the use of a circular lip or plate at or near the entrance of a valve port is known in the art (as shown in U.S. Pat. Nos. 109,906 and 1,084,248), such devices are ineffective in high pressure and temperature applications and have not been used as a means to actually reduce or control the size of solid materials in the fluid stream by actuation of the valve itself.

The present invention, unlike prior art three-way type valves, serves a dual function in that it not only effectively controls the flow of liquids while maintaining a tight seal, it also acts as an additional processing device by virtue of the cutting action of the valve ports themselves. As those skilled in the art can readily appreciate, the metallurgical characteristics as well as the dimensions and configurations of the knife edge may vary considerably depending upon the particular application in which the valve is actually used.

Thus, it is the object of the present invention to provide a tri-port type cylinder control valve having means to reduce the size of solid materials which otherwise might cause a flow restriction in the valve or its associated piping elements. It is a further object of the invention to provide a mounting structure having sealing means which will withstand severe pressure, temperature and shock conditions over an extended period of operation. Still another object of the invention is to provide a valve construction capable of modification while in operation in order to compensate for variations in wear and sealing ability without requiring any disassembly of the valve components.

Other and further objects, features and advantages of the subject invention will appear more fully from the following description of illustrative embodiments taken in conjunction with the appended drawings.

BRIEF DESCRIPTION OF THE DRAWINGS

FIG. 3 is a perspective view of the internal valve core portion of the invention;

FIG. 4 is a side elevation view of a cutting plate constructed in accordance with the invention; and FIG. 5 is a partial view, partly in cross-section, illustrating the valve housing and a portion of the internal valve core.

DETAILED DESCRIPTION OF THE DRAWINGS

Figure 1:
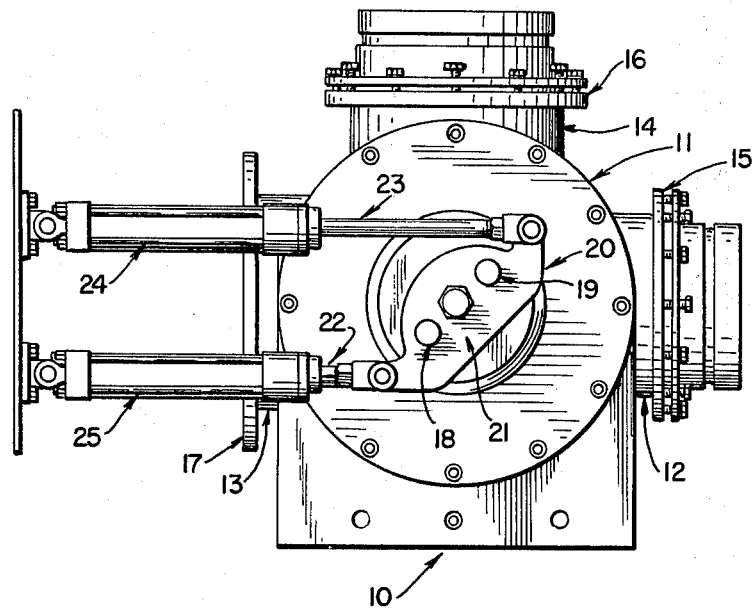
FIG. 1 is an elevation view of the three-way control valve in accordance with the present invention.

With particular reference to FIG. 1, the three-way valve assembly in accordance with the invention is shown generally at 10. The valve housing or bonnet 11 is provided with two axially-aligned cylindrical end ports 12 and 13 and a third port 14 disposed midway between and at a right angles to the end ports. Flanges 15, 16 and 17 are provided at the end of each port for attachment to a suitable pipe fitting or other fluid transfer element by peripherally-spaced nuts and bolts. During normal operation, common port 13 will be in fluid communication with either port 12 or 14, depending upon the position of the valve core journalled for rotation and disposed within the housing as shown in FIGS. 3 and 5. The position of the valve core may be changed by means of external turning pins 18 and 19 which are attached to the outside of one end portion of the valve core. The turning pins may be automatically rotated 90° in either a clockwise or counterclockwise direction by means of the bracket and lever-arm assembly shown generally at 20. Valve bracket plate 21 is permanently affixed to turning pins 18 and 19 and is rotated by means of the reciprocal action of drive shafts 22 and 23 which, in turn, are actuated by two conventional hydraulic cylinders 24 and 25. The embodiment shown in FIG. 1 may be used to automatically change the valve position and is particularly suited to process conditions in the meat and poultry packing industry in which the manual operation of the valve under high pressure and temperature conditions would not be practical.

Figure 2:
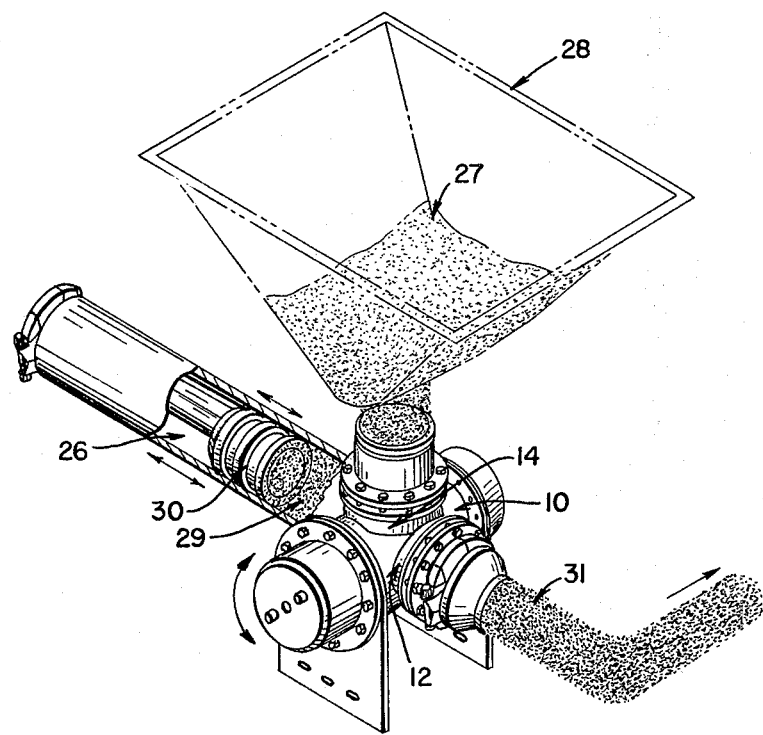
FIG. 2 is a perspective view of the three-way control valve in accordance with the present invention as installed with typical associated process piping elements.

With particular reference to FIG. 2, three-way valve 10 is shown assembled with typical associated process piping elements. A conventional reciprocating transfer pump shown generally at 26 operates to induce the semi-liquid materials 27 in hopper 28 through valve port 14 into the discharge portion of the transfer piping at 29. As pump cylinder piston 30 retracts, valve 10 is open to the hopper and closed to the control valve discharge piping 31. As pump cylinder piston 30 moves forward, valve 10 is automatically rotated 90 degrees in a clockwise direction, allowing semi-liquid material to be ejected via valve port 12. The cycle is then repeated whereby valve 10 again opens to receive materials from hopper 28. Thus, during normal operation, the valve operates in a continuous cycle whereby it snaps open and closed under the extreme torque conditions necessary to sever any solid materials at or near the valve openings.

With particular reference to FIG. 3, the cylindrical valve body in accordance with the subject invention is shown generally at 32 and is journalled for rotation within valve housing 11. The large diameter center portion of the core contains three fluid passages formed therein as depicted at 33, 34 and 35 (FIG. 5), respectively. The two external cylindrical end portions 36 and 37 of the valve core are smaller in diameter and permanently attach to valve body 32. Sleeves 38 and 39 (FIG. 5) are permanently affixed to the journalled end portions and to valve body 32 and, as such, provide additional structural support for the end portions as torque is applied to rotate the valve body via turning pins 18 and 19.

FIG. 3 also shows three cutting plates 40 (shown in a partial section view), 41 and 42 constructed in accordance with the subject invention prior to attachment to valve body 32. Each such cutting plate is precisely machined and sized such that the circular opening on the bottom portion of the cutting plate will coincide exactly with the diameter of the three fluid passage openings. In the embodiment depicted in FIG. 3, the knife-edge portion of each plate is shown as having a beveled configuration and a slightly smaller diameter opening than the fluid passage. The cutting edge of the plate will, therefore, extend into the semi-liquid process stream during normal operation when its associated valve port is in an open position. As FIG. 3 also indicates, prior to attachment of the individual cutting plates, valve body 32 contains three cut-away sections, two of which are shown at 43 and 44 and which are sized to receive plates 40, 41 and 42. The top crown portions of the cutting plates likewise are sized such that once assembled with valve body 32, they will conform to the cylindrical configuration of the valve core.

As those skilled in the art can appreciate, the metallurgical characteristics, cutting dimensions and design configurations of the knife-edge portion of the cutting plates may vary considerably depending upon the particular application in which the valve is actually used. Thus, as depicted in FIG. 4, the diameter "D" of the knife-edge portion 45 may either be increased or decreased depending on the process flow conditions and/or physical properties and composition of the semi-liquid being transported. The degree of beveling (curvature) of the knife edge at 46 may also vary depending upon the particular application in question.

With particular reference to FIG. 5, a cross section of the valve body depicts cylindrical-shaped fluid passages 33, 34 and 35 formed therein such that passages 33 and 35 are axially-aligned and perpendicular to passage 34. Cutting plates 40, 41 and 42 are also shown in their assembled position relative to each fluid passage.

FIG. 5 also depicts the essential components of the valve housing or bonnet 11 and sealing means according to the subject invention located between the housing and the valve body. An inner cylindrical sleeve is disposed inside each of the exit ports (shown at 47 for exit port 14 on FIG. 5) and extends through the housing opening to engage the outer surface of valve body 32. Inner sleeve 47 is attached to housing 11 via adjustable flanges 48 and 49. In the preferred embodiment of the invention, the valve sealing means also includes a plurality of cylindrical sealing devices (as shown, for example, at 50 on FIG. 5) disposed inside sleeve 47 and also extending to the outside surface of valve body 32. The end (lip) portion of sleeve 50 has a beveled configuration so as to fit snugly against inner sleeve 47. Sealing sleeve 50 may then be manually adjusted relative to the valve housing by positioning and tightening adjustable flanges 48 and 49. Thus, over an extended period of time, the positions of the sealing sleeves may be changed to compensate for the wear of the valve seats, including any deterioration of the cutting plates, to thereby maintain a fluid-tight seal without dismantling the valve or its associated piping.

Because of the high temperatures encountered during normal operation of the valve, the valve body will expand slightly, thereby reducing the clearance between inner sleeve 47 and the outside surface of valve body 32. In addition, increased wear inevitably will take place at the cutting points between inner sleeve 47 and sealing sleeve 50. Thus, in the preferred embodiment of the invention, inner sleeve 47 is sized such that a fixed clearance will be maintained between the sleeve and valve body 32, even at a maximum anticipated operating temperature. In this regard, it has been found that the use of one or more "bastard-type" file cuts (as shown, for example, along lines F1 and F2 on FIG. 3) may be used to enhance the sealing and wear capabilities of the valve while maintaining the necessary expansion clearance. In addition, the preferred embodiment of the invention utilizes valve bearings composed of high density polyethylene which do not require lubrication and, therefore, do not pose any problem of contamination of the process stream.

FIG. 5 also shows means for providing a continuous water flush across the two valve seats which are in fluid communication while the valve is in service. Water at a pressure exceeding that of the fluid process stream is fed to the valve core at 51 and circulates between the housing and the outside end portion of valve body 32 in the area shown by 52. The water flush then exits from the housing at outlet 53. Thus, during normal operation, a constant positive water flush may be maintained across the periphery of valve body 32 to ensure that all three valve seats remain clear and free from obstruction.

What is claimed is:

1. A valve for controlling the flow of a liquid stream containing solid materials, comprising a valve housing having at least two housing ports for fluid communication with said liquid stream, a cylindrical valve core journaled for rotation within said housing to provide fluid communication between said housing ports and having fluid passages formed therein, at least one of said fluid passages having cutting plate means disposed at the opening of said fluid passage for cutting solid materials during activation of the valve, and means for rotating said valve core to provide fluid communication between said housing ports and said fluid passages, said cutting plate means comprising a circular knife edge disposed along the outside edge of at least one of said fluid passages.

2. A valve as defined in claim 1 wherein said circular knife edge of said cutting plate means has a beveled configuration.

3. A valve as defined in claim 1 or 2 wherein the diameter of said circular knife-edge is less than the diameter of said one of said fluid passages.

4. A valve as defined in claim 1 wherein sealing means are provided between said valve housing and the outer surface of said valve core, said sealing means including a plurality of cylindrical sleeves disposed inside each of said housing ports and extending to the outer surface of said valve core.

5. A valve as defined in claim 4 wherein the diameter of at least one of said plurality of cylindrical sleeves is approximately equal to the inside diameter of said housing ports and wherein one end of said one of said cylindrical sleeves has a beveled configuration.

6. A valve as defined in claim 1 wherein means are provided for continuously injecting a water flush across the opening of at least one of said cylindrical fluid passages, said means including at least two openings in said valve housing on opposite sides of said cylindrical valve core.

7. A valve as defined in claim 1 wherein said valve housing includes three cylindrical housing ports, two of said cylindrical housing ports being axially aligned, and wherein said valve core has three cylindrical fluid passages formed therein.

* * * * *